Sept. 14, 1954

J. V. SOMMER 2,688,869

PRECISION MICROVISCOSIMETER

Filed Nov. 14, 1949

Julius V. Sommer Inventor

By W. N. Wright Attorney

UNITED STATES PATENT OFFICE 2,688,869

PRECISION MICROVISCOSIMETER

Julius V. Sommer, Elizabeth, N. J., assignor to Standard Oil Development Company, a corporation of Delaware Application November 14, 1949, Serial No. 127,089

3 Claims. (Cl. 73—55)

This invention relates to a novel form of viscosimeter adapted for the accurate determination of the kinematic viscosity of small quantities of fluids. The viscosimeter of this invention permits the determination of the kinematic viscosity of petroleum products and related chemical materials over a working range of about 2 to 10,000 centistokes with an accuracy of about plus of minus 2% or better.

Viscosity determinations are relied upon in many industries to determine product quality, as a means of process control, and as a means of characterization. Consequently, many methods have been developed for determining the viscosity of fluids. A need has become apparent, however, for an improved type of viscosimeter capable of yielding accurate viscosity determinations when utilizing comparatively minute samples of fluids. Thus, while suitable macroviscosimeters are available, desirable microviscosimeters have not yet been developed to the point of convenience and accuracy comparable to that of macroviscosimeters. It is, therefore, the principal object of this invention to provide an improved type of microviscosimeter which may conveniently be used to provide precise viscosity determinations when using samples of about 0.06 milliliter, or less.

In accordance with this invention it has been determined that accurate viscosity determinations may be made by timing the flow of a drop of fluid through an inclined capillary tube. Such an inclined capillary tube may readily be provided with temperature control jackets to effect viscosity determinations at controlled and desired temperatures. Again, the direction of inclination of the capillary tube may be reversed in a series of successive determinations so as to eliminate any possible errors due to inaccuracies in the assembly of the apparatus, or minute differences in the angle of inclination. Consequently, the essential feature of the apparatus of this invention; that is, the use of an inclined capillary tube is uniquely qualified to achieve the objects of this invention.

Figure 1:
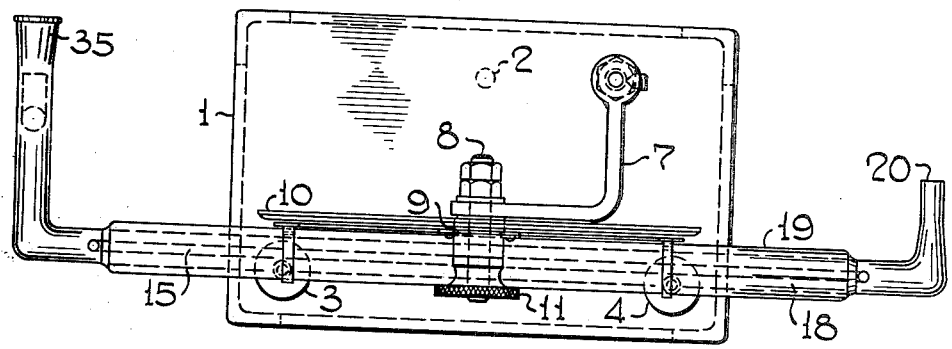
Figure 2:
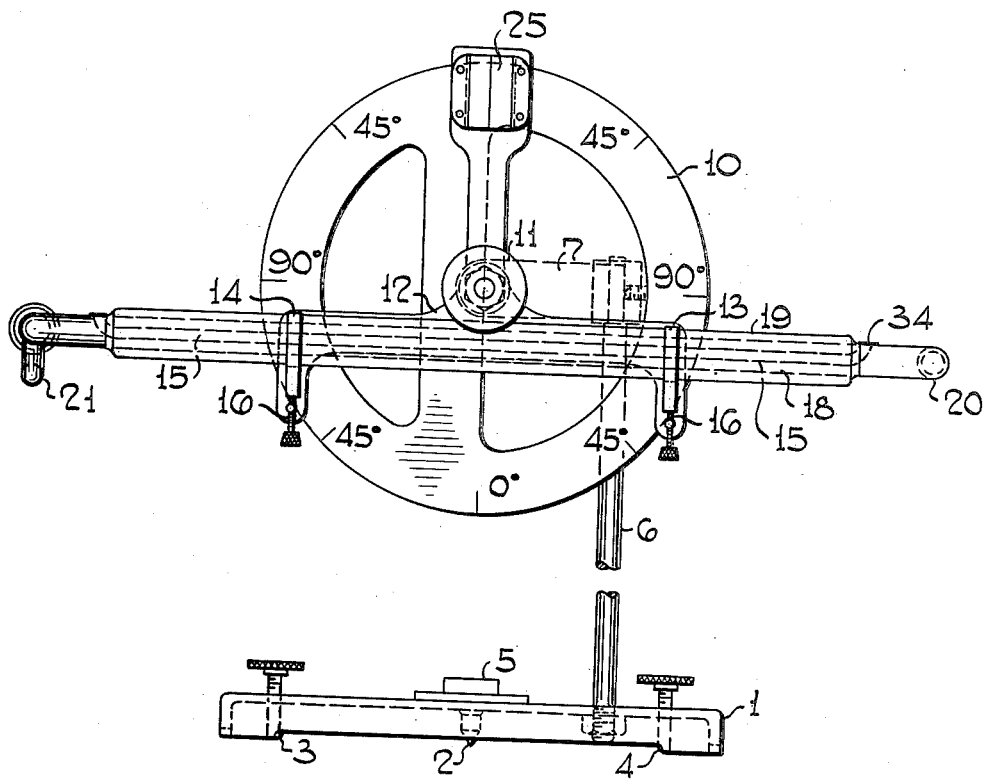

By reference to the attached drawings illustrating a preferred embodiment of this invention, the nature of the novel apparatus will be appreciated. In these drawings Figure 1 shows a plan view of the apparatus, while Figure 2 represents a front elevational view of the novel viscosimeter.

Referring to the drawings it will be observed that the apparatus includes a base plate, supporting rod, and a precision protractor together with a balance arm supporting a jacketed capillary tube so as to permit reading of the protractor to determine the angle of inclination of the capillary tube. The apparatus includes means for adjustably controlling the inclination of the capillary tube and the level of the base plate of the viscosimeter and for delicate adjustment of the position of the capillary tube on the balance arm.

In the drawings the numeral 1 designates the base plate on which the viscosimeter is supported. This base plate is provided with levelling adjustments of the nature used on analytical balances, and the like. Thus, as illustrated, three support points may be provided for the base plate consisting of the point support 2, and the levelling or adjusting screws 3 and 4. A conventional type of levelling bubble, or levelling gage 5 may be positioned on the base plate to permit levelling of the base plate by adjustment of the screws 3 and 4. A supporting rod 6 is fixed to the base plate 1 so as to be substantially vertical when the base plate has been levelled. This supporting rod is provided at the upper portion thereof with an L-shaped bracket 7. The L-shaped bracket is provided with a clearance hole through which a threaded bolt may be passed to support the remaining elements of the apparatus. Thus a bolt 8 is passed through the hole in the bracket 7, adapted to hold the protractor and capillary tube support or balance arm to the bracket. As will become apparent, it is necessary that the protractor be fixed to the bracket 7 so that the protractor may be maintained in a set non-rotatable manner. However, it is necessary that the capillary tube support be held on the bracket in a rotatable manner. This may readily be accomplished by threading the bolt 8 at both ends thereof, and by providing an enlarged annular shoulder 9 on the bolt. Consequently, in assembling the apparatus, the bolt 8 may be passed through a central clearance hole in the protractor 10, and then through the bracket 7 so that the shoulder 9 on the bolt 8 will firmly force the protractor 10 against the bracket 7 so as to hold it in non-rotatable relation therewith. The capillary tube support may then be held in rotatable relation with the bolt 8 by using a clamping screw 11 to hold the capillary tube support 12 against the opposite side of the shoulder 9 of the bolt 8. Thus, by unscrewing the clamping screw 11 it will be possible to rotate the capillary tube support 12 while on tightening the clamping screw 11 the capillary tube support 12 may be fixed in a set position.

The capillary tube support 12 may, as illustrated, consist of a T-like bracket arrangement. The cross-arms of the T at their outermost positions are provided with clamping devices 13 and 14 to support the capillary tube 15. The leg of the T is provided with a transparent window frame 25 provided with a hairline so that the window frame and hairline will be moved over the markings of the protractor 10 on rotation of the capillary tube support 12. The clamping devices 13 and 14 are equipped with adjusting screws 16 and 16 of a nature to permit minute changes in the position of the capillary tube 15 on the tube support 12. As illustrated, this may be accomplished by passing the adjusting screws 16 and 16 in threaded relation through lugs extending from the supporting bracket 12, so that on rotation of the adjusting screws the clamps 13 and 14 of the capillary tube will be moved upwardly or downwardly in slots provided on the supporting bracket 12.

The capillary tube 15 is preferably provided with a double jacket as illustrated consisting of a water jacket 18 and a vacuum jacket 19. Suitable openings 20 and 21 are provided in the water jacket 18 to permit water, or other fluid to be passed through this jacket. The vacuum jacket 19 is preferably sealed to the capillary jacket, or water jacket under evacuated conditions. The capillary tube, or one of its associated jackets, is provided with calibration marks along its length, for example each 0.01 ml. linear volume of the capillary may be indicated.

As described, therefore, the apparatus illustrated simply consists of a capillary tube 15 which is equipped with a water jacket, and a vacuum jacket, and is supported to a base plate so as to be in rotatable relation with a fixed protractor. The construction is of such a nature that rotation of the capillary tube about a pivot point located at the center of the protractor moves a balance arm equipped with a window frame over the calibrations of the protractor. Means are provided to level the base of the apparatus and to delicately change the position of the capillary tube on its rotatable support.

In the operation of this apparatus a suitable constant temperature bath, not illustrated in the drawing, is utilized as a source of constant temperature fluid such as water, to be pumped through the water jacket 18. By this means the temperature of the capillary tube 15 may be precisely maintained within desired limitations, particularly as aided by provision of the vacuum jacket 19. Assuming then that a suitable constant temperature fluid is being pumped through the jacket 18 to maintain the capillary tube at a desired temperature, the first step in the viscosity determination is to precisely level the base 1 by utilization of the adjusting screws 3 and 4, and by reference to the level gage 5. Adjustment screw 11 is then loosened to permit rotation of the capillary tube and its bracket 12, so that the hairline of the window frame 25 may be brought to the 0 setting of the protractor scale. When this has been done, the capillary tube 15 should be in a horizontal position. However, to check this a suitable liquid may be used to partially fill the capillary 15 to serve as a levelling fluid. It is convenient to use benzene, toluene or xylene for this purpose. By reference to the benzene meniscus in the capillary tube 15, it can be determined whether or not the capillary tube is in a horizontal position. If this is not the case, the fine levelling screws 16 and 16, may be rotated so as to level the capillary tube 15. Practically it is considered that this tube is level whenever the meniscus of the drop of benzene in the capillary remains motionless for at least five minutes.

It is necessary that the capillary tube be suitably cleaned before admission of the sample and before viscosity determinations can be made. The capillary tube may be cleaned, for example, by using a chromic acid cleaning solution followed with an acetone wash to dry the capillary.

In order to conduct viscosity determinations, a small semicapillary eyedropper may be used to insert about 0.06 to 0.08 ml. of liquid into one end, for example the right hand entrance 34 of the capillary. Adjusting screw 11 is then loosened sufficiently to permit inclining the capillary tube from right to left so as to cause the liquid to pass towards the left hand side of the capillary. On approaching the left end of the capillary, the capillary is then rotated so that it tilts from left to right so as to bring the liquid back to the right hand end of the capillary. This operation serves to provide a liquid film along the walls of the capillary. Thereafter the capillary tube is tilted from the horizontal by a given number of degrees, and the period of time required for the liquid to move along a given length of the capillary is recorded. By then reversing the tilt of the capillary the time required for liquid to return along the given length of capillary is again determined. The time required for the movement of this liquid along the capillary gives a precise indication of the kinematic viscosity of the liquid. The precise value of kinematic viscosity may be determined by suitable calibration procedures involving the determination of the time required for standard viscosity control samples to flow along a given length of the capillary tube at given angles of inclination.

To obtain the high precision required in viscosity determinations the window frame 25, and the markings on the protractor 10 are preferably of such a nature that angles may be determined within about one minute. For this purpose the window frame 25 may conveniently be provided with a vernier. While only two points need be marked along the capillary 18 to serve as reference points for the time of liquid flow along the capillary, it is convenient to graduate the capillary along its length. The usual inclination employed for the capillary tube is about 1 to 50 degrees although inclinations up to almost 90 degrees may be employed. For best accuracy, it is preferred that an angle be chosen so that the time required for passage of a liquid along a substantial portion of the capillary tube is at least about 10 seconds, but greater times may be employed, for example, up to 300 or 500 seconds or higher. By way of example, when employing apparatus of the nature described, it was found that an inclination of about 15° was required to obtain a flow time of about 10 seconds employing a fluid having a kinematic viscosity of three or four. For a medium viscosity fluid inclinations of 30–40 degrees will give flow times of about 10 seconds while a 5 to 7 degree inclination will give flow times of about 300 seconds. For most precise results it is desirable to ascertain the flow time of a sample (within the range of 10 to 300 seconds) at several angles of inclination and with the inclination alternately from right to left and from left to right. It has also been found that greater precision is obtained by timing the flow of the leading meniscus of the sample from the starting point to the trailing meniscus of the sample past the finishing point.

To more clearly indicate the nature of the apparatus described, and by way of example, the following data relates to the actual dimensions of the apparatus. The capillary tube may consist of a tube having about 6 mm. outside diameter and about 1 mm. inside diameter. The total length of the capillary tube may be about 12 inches, with the outside marks about 10 inches apart so that the effective volume between the marks is about 0.3 ml. These dimensions can of course be varied at will. For example, the diameter may be smaller or greater for use with relatively non-viscous or very viscous oils, and the length can be increased if still greater precision is required. A protractor having a diameter of about 8 inches and being calibrated in subdivisions of 0.5 degree is suitable. It is convenient to provide a ground glass joint 35 at the opening of the water jacket 21 to permit insertion of a thermometer in the exit stream of fluid passed through the water jacket. The remaining portions of the apparatus may be made of any suitable dimensions.

It will be observed that the apparatus of this invention has several outstanding advantages. First, the apparatus is exceedingly flexible in use as a wide range of viscosities may be determined depending upon the inclination given to the capillary tube. Secondly, the provision for reversing the direction of inclination for successive readings eliminates any possible inaccuracy in the levelling of the apparatus, or in the levelling of the capillary tube. As a third advantage, the simplicity of the apparatus, and ease of fabrication may be noted.

What is claimed is:

1. In a viscosimeter of the character described, including a base, a standard mounted on said base in perpendicular relation thereto, and a bracket carried by said standard, the combination therewith comprising a protractor dial mounted on said bracket in parallel relation to said standard and in fixed relation to said bracket; T-shaped indicator support including a cross arm portion and an indicator leg portion perpendicular thereto, which support is rotatably mounted on said bracket by means of said leg portion and with said leg portion extending radially of said dial and in parallel relation thereto, said leg portion including means to indicate inclination of said leg and cross arm portions by reference to said dial, clamping means carried by said cross arm portion substantially aligned longitudinally thereof, a capillary tube supported longitudinally of said cross arm portion by said clamping means, means for introducing and removing a liquid sample into said tube, and means for maintaining said sample at a constant temperature therein.

2. The process of determining the kinematic viscosity of a liquid which comprises introducing a sample of up to about 0.08 milliliter of a liquid into a straight inclined capillary path providing a drop-like body of liquid in the path having a leading and a trailing meniscus, causing the sample of liquid to flow the length of the capillary thus wetting the capillary, maintaining the sample of liquid at a constant temperature, and then determining the time required for the sample to flow a predetermined distance in said wetted capillary.

3. A process according to claim 2 in which the predetermined distance traveled by said sample is from an initial point at the leading meniscus of said sample to a final point at the trailing meniscus of said sample, and which points are spaced to provide an effective volume between said points of about 0.3 milliliter.

References Cited in the file of this patent

UNITED STATES PATENTS

| Number | Name | Date |
|---|---|---|
| 1,244,025 | Browning | Oct. 23, 1917 |
| 2,171,823 | Baker | Sept. 5, 1939 |
| 2,343,061 | Irany | Feb. 29, 1944 |

OTHER REFERENCES

"Drilling and Production Practice," 1939, page 659 of the American Petroleum Institute publication.